United States Patent
Mukherjee et al.

(10) Patent No.: US 12,293,190 B2
(45) Date of Patent: *May 6, 2025

(54) MANAGING COMMIT ORDER FOR AN EXTERNAL INSTRUCTION RELATIVE TO QUEUED INSTRUCTIONS

(71) Applicant: Marvell Asia Pte, Ltd., Singapore (SG)

(72) Inventors: Shubhendu Sekhar Mukherjee, Southborough, MA (US); David Albert Carlson, Haslet, TX (US); Michael Bertone, Marlborough, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 1255 days.

This patent is subject to a terminal disclaimer.

(21) Appl. No.: 17/036,028

(22) Filed: Sep. 29, 2020

(65) Prior Publication Data
US 2021/0011729 A1    Jan. 14, 2021

Related U.S. Application Data

(63) Continuation of application No. 16/171,881, filed on Oct. 26, 2018, now Pat. No. 10,817,300.

(51) Int. Cl.
*G06F 9/38* (2018.01)
*G06F 9/30* (2018.01)

(52) U.S. Cl.
CPC ........ *G06F 9/3836* (2013.01); *G06F 9/30076* (2013.01); *G06F 9/30087* (2013.01); *G06F 9/3854* (2023.08); *G06F 2212/683* (2013.01)

(58) Field of Classification Search
CPC .............. G06F 9/3004; G06F 9/30076; G06F 9/30087; G06F 9/38; G06F 9/3836;
(Continued)

(56) References Cited

U.S. PATENT DOCUMENTS 6,119,204 A    9/2000  Chang
6,370,632 B1   4/2002  Kikuta
(Continued)

OTHER PUBLICATIONS

Hennessy et al., "Computer Architecture—A Quantitative Approach", 2nd Edition, 1996, 946 pages.*
(Continued)

*Primary Examiner* — David J. Huisman
(74) *Attorney, Agent, or Firm* — Young Basile Hanlon & MacFarlane, P.C.

(57) ABSTRACT

In a pipeline configured for out-of-order issuing, handling translation of virtual addresses to physical addresses includes: storing translations in a translation lookaside buffer (TLB), and updating at least one entry in the TLB based at least in part on an external instruction received from outside a first processor core. Managing external instructions includes: updating issue status information for each of multiple instructions stored in an instruction queue, processing the issue status information in response to receiving a first external instruction to identify at least two instructions in the instruction queue, including a first queued instruction and a second queued instruction. An instruction for performing an operation associated with the first external instruction is inserted into a stage of the pipeline so that the operation associated with the first external instruction is committed before the first queued instruction is committed and after the second queued instruction is committed.

20 Claims, 3 Drawing Sheets

(58) Field of Classification Search
CPC .... G06F 9/3854; G06F 9/3855; G06F 9/3858; G06F 12/0811; G06F 12/1027; G06F 2212/1024; G06F 2212/452; G06F 2212/683

See application file for complete search history.

(56) References Cited

U.S. PATENT DOCUMENTS

| | | |
|---|---|---|
| 9,384,133 B2 | 7/2016 | Gschwind |
| 9,501,425 B2 | 11/2016 | Mukherjee et al. |
| 9,665,505 B2 | 5/2017 | Mukherjee et al. |
| 9,710,394 B2 | 7/2017 | Guthrie et al. |
| 9,870,328 B2 | 1/2018 | Mukherjee et al. |
| 10,013,357 B2 | 7/2018 | Mukherjee et al. |
| 10,817,300 B2 * | 10/2020 | Mukherjee ............ G06F 9/3836 |
| 2004/0215898 A1 | 10/2004 | Arimilli |
| 2010/0332786 A1 | 12/2010 | Grohoski |

OTHER PUBLICATIONS

Khan, "Precise Exceptions and Out-of-Order Execution", University of Virginia, CS 3330, Mar. 16, 2017, pp. 1-39, Retrieved from the Internet <URL: https://www.cs.virginia.edu/~cr4bd/3330/S2017/notes/20170316-part2-slides-1up.pdf >.*

* cited by examiner

| | 302 | 304 | 306 | |
|---|---|---|---|---|
| 300 | INSTRUCTION 60 | DECODED INFORMATION | 0 | |
| | INSTRUCTION 59 | DECODED INFORMATION | 0 | |
| | INSTRUCTION 58 | DECODED INFORMATION | 0 | |
| | INSTRUCTION 57 | DECODED INFORMATION | 0 | |

⋮

| | | | | |
|---|---|---|---|---|
| INSTRUCTION 33 | DECODED INFORMATION | 0 | ← P |
| INSTRUCTION 32 | DECODED INFORMATION | 1 | ← L |
| INSTRUCTION 31 | DECODED INFORMATION | 0 | ← U1 |
| INSTRUCTION 30 | DECODED INFORMATION | 0 | ← U2 |
| INSTRUCTION 29 | DECODED INFORMATION | 1 | |
| INSTRUCTION 28 | DECODED INFORMATION | 1 | |
| INSTRUCTION 27 | DECODED INFORMATION | 0 | ← U3 |
| INSTRUCTION 26 | DECODED INFORMATION | 1 | |

⋮

| | | |
|---|---|---|
| INSTRUCTION 4 | DECODED INFORMATION | 1 |
| INSTRUCTION 3 | DECODED INFORMATION | 1 |
| INSTRUCTION 2 | DECODED INFORMATION | 1 |
| INSTRUCTION 1 | DECODED INFORMATION | 1 |

FIG. 3

MANAGING COMMIT ORDER FOR AN EXTERNAL INSTRUCTION RELATIVE TO QUEUED INSTRUCTIONS

CROSS-REFERENCE TO RELATED APPLICATIONS

This application is a continuation of U.S. patent application Ser. No. 16/171,881, filed on Oct. 26, 2018, and issued as U.S. Pat. No. 10,817,300, the entire disclosure of which is incorporated herein by reference.

BACKGROUND

The invention relates to managing pipeline instruction insertion for received external instructions.

Many modern processors support hierarchical cache systems with multiple levels of cache, including one or more levels within a processor, or within a processor core (or simply "core") of a multi-core processor, starting with a level one (L1) cache, and one or more levels external to the processor or cores, up to a last level cache (LLC) that is accessed just before main memory is accessed. At each level of the hierarchy, the cache stores copies of a subset of data for a data cache, or instructions, for an instruction cache, to speed access to the data or instructions by the processor relative to the speed of a higher level cache (or relative to the speed of the main memory for the LLC). Lower level caches are closer to the processor (or core), whereas higher level caches are further away from the processor (or core). The LLC is typically shared by all of the cores of a multi-core processor. At each level, the cache system will load blocks of data or instructions into entries and evict blocks of data or instructions from entries in units of memory blocks (also called "cache lines" or "cache blocks"). Each memory block includes a number of words of data or instructions, each word consisting of a predetermined number of bytes. A memory page typically has data or instructions from many memory blocks.

Modern processors also support virtual memory, which allows program instructions being executed by a CPU to refer to virtual addresses within a virtual address space that is larger than a physical address space that is defined by the size of main memory. Virtual memory involves address translation from one or more such virtual address spaces into a physical address space. The translation is performed using a page table that stores mappings between virtual addresses and physical addresses (also called "translations") at a granularity of memory pages (or simply "pages"). The lowest order bits of the virtual address and physical address, called the "page offset," are typically identical, such that data occurring at a particular location in a virtual page occurs at the same relative location in a corresponding physical page. Copies of these translations can be stored within a processor or core, in storage circuitry called a translation lookaside buffer (TLB), which acts as a cache for translations.

SUMMARY

In one aspect, in general, an integrated circuit comprises: at least a first processor core executing instructions in a pipeline configured for out-of-order issuing of instructions; translation circuitry configured to handle translation of virtual addresses to physical addresses; and instruction management circuitry. The handling by the translation circuitry includes: storing translations between virtual addresses and physical addresses in a translation lookaside buffer, and updating at least one translation lookaside buffer entry in the translation lookaside buffer based at least in part on an external instruction received from outside the first processor core. The instruction management circuitry is configured to manage external instructions received from outside the first processor core. The managing by the instruction management circuitry includes: updating issue status information for each of a plurality of instructions stored in an instruction queue, processing the issue status information in response to receiving a first external instruction to identify at least two instructions in the instruction queue, the identified instructions including a first queued instruction and a second queued instruction, and inserting an instruction for performing an operation associated with the first external instruction into a stage of the pipeline so that the operation associated with the first external instruction is committed before the first queued instruction is committed and after the second queued instruction is committed.

In another aspect, in general, a method comprises: executing instructions in a pipeline of a first processor core, the pipeline being configured for out-of-order issuing of instructions; handling translation of virtual addresses to physical addresses, the handling including: storing translations between virtual addresses and physical addresses in a translation lookaside buffer, and updating at least one translation lookaside buffer entry in the translation lookaside buffer based at least in part on an external instruction received from outside the first processor core; and managing external instructions received from outside the first processor core. The managing includes: updating issue status information for each of a plurality of instructions stored in an instruction queue, processing the issue status information in response to receiving a first external instruction to identify at least two instructions in the instruction queue, the identified instructions including a first queued instruction and a second queued instruction, and inserting an instruction for performing an operation associated with the first external instruction into a stage of the pipeline so that the operation associated with the first external instruction is committed before the first queued instruction is committed and after the second queued instruction is committed.

Aspects can include one or more of the following features.

Updating at least one translation lookaside buffer entry in the translation lookaside buffer based at least in part on an external instruction received from outside the first processor core into the pipeline comprises invalidating at least one translation lookaside buffer entry in the translation lookaside buffer before an associated synchronization operation is committed by the commit stage.

The managing further includes maintaining an indication of the program order for the plurality of instructions as they are stored in the instruction queue.

The first queued instruction is an unissued instruction that is adjacent to an issued instruction in the program order, with no later instructions in the program order having been issued, and the second queued instruction is an unissued instruction that is adjacent to an issued instruction in the program order, with all earlier instructions in the program order having been issued.

Processing the issue status information includes scanning the instruction queue from the latest in the program order to the earliest in the program order, identifying the first queued instruction and second queued instruction according to their respective issue status information.

The operation associated with the first external instruction comprises the associated synchronization operation.

The plurality of instructions include at least two instructions that are issued out-of-order relative to each other, according to a program order for the plurality of instructions, in at least one issue stage of the pipeline, and the plurality of instructions are committed in-order, according to the program order, in at least one commit stage of the pipeline.

At least one second processor core in the integrated circuit provides the first external instruction.

Aspects can have one or more of the following advantages.

The techniques described herein ensure correct operation of the integrated circuit and its processor cores, including correct operation when inserting into a pipeline an instruction for performing an operation associated with an external instruction. For example, an instruction set architecture may provide different types of invalidation instructions that are broadcast among the cores to ensure an entry in a cache or TLB is consistently removed or marked as being invalid for all the cores. An instruction cache invalidate (ICI) instruction can be used to invalidate entries in instruction caches, and a TLB invalidate (TLBI) instruction can be used to invalidate entries in a TLBs.

In the case of managing coherence among TLBs, when a translation is changed, in addition to updating the page table, any copy of the old translation that may be stored in a TLB of a core needs to be invalidated. In that scenario, a TLBI instruction may then be broadcast to each core, specifying (explicitly or implicitly) one or more translations to be invalidated. Some TLBI instructions invalidate translations for virtual addresses implicitly (e.g., based on context information, such as an exception level, or other information) without specifying a particular virtual address, and some TLBI instructions, called "address-based" TLBI instructions, invalidate translations for virtual addresses by explicitly indicating an actual address (for a particular memory page) whose translation is now invalid.

When a particular core issues such an invalidation instruction, the invalidation instruction is performed at that particular (local) core and is also broadcast to all other (remote) cores in the processor, or all remote cores within a socket or possibly within multiple sockets, where it is received as an external instruction. Generally, an "external instruction" is an instruction that was not originally issued by the processor core in which it is being executed. There is not necessarily any particular ordering required between an incoming invalidation instruction received at a remote core and sequence of instructions already being executed within the remote core. However, the local core that initiated a set of one or more invalidation instructions (e.g., a combination of TLBI and ICI instructions) is able to issue a data synchronization barrier (DSB) instruction after the set of invalidation instructions to ensure that the effect of those invalidation instructions have been globally observed (i.e., have taken effect at all cores in the processor). That way, any instructions that appear in program order after the DSB instruction access correct values within any instruction cache or TLB. Alternatively, some synchronization instructions, such as a Data Memory Barrier (DMB) instruction, only enforce ordering with respect to specific kinds of instructions (e.g., memory access instructions for a DMB instruction). In some implementations, a DSB instruction causes (e.g., as a side-effect of issuing the DSB instruction) broadcast of a Global Synchronization (GlobalSync) instruction that indicates a GlobalSync operation is to be performed at each of the cores in the processor.

The techniques described herein ensure that such an instruction such as a GlobalSync instruction, when received as an external instruction, is inserted in the appropriate order with respect to other instructions being executed in a processor core, without causing undue delay in execution, as explained in more detail below.

Other features and advantages of the invention will become apparent from the following description, and from the claims.

DESCRIPTION

Figure 1:
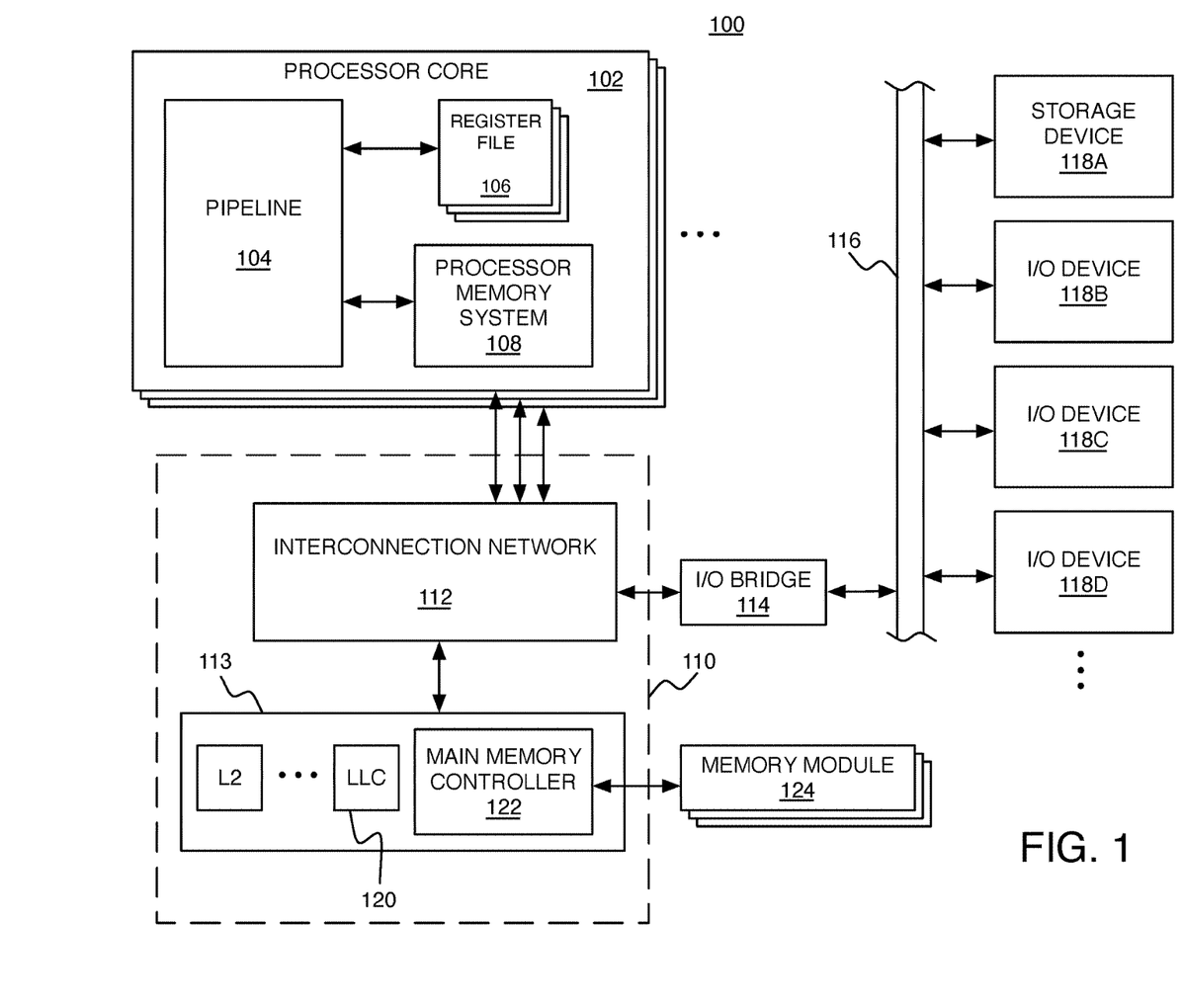
FIG. 1 is a schematic diagram of a computing system.

FIG. 1 shows an example of a computing system 100 in which the techniques described herein can be used. The system 100 includes processor cores 102 of a multi-core architecture, where each processor core 102 (or each "core") comprises an individual central processing unit (CPU) with associated circuitry. In this example, each processor core 102 includes a pipeline 104, one or more register files 106, and a processor memory system 108. Each processor core 102 is connected to an uncore 110, which includes an interconnection network 112 (e.g., bus, cross-bar switch, mesh network, etc.) and an external memory system 113. The interconnection network 112 enables communication with the external memory system 113 and an input/output (I/O) bridge 114. The I/O bridge 114 enables communication over an I/O bus 116, with various different I/O devices including a storage device 118A and other I/O devices 118B-118D (e.g., network interface, display adapter, and/or user input devices such as a keyboard or mouse). The storage device 118A such as a disk drive or other large capacity (typically non-volatile) storage device can spare some space to serve as secondary storage (or a 'backing store') in a virtual memory scheme for the (typically volatile) main memory.

The processor memory system 108 and external memory system 113 together form a hierarchical memory system including at least a first level (L1) cache within the processor memory system 108, and any number of higher level (L2, L3, . . . ) caches within the external memory system 113. At each level, the cache can include a module that provides an instruction cache for caching instructions, and separate module that provides a data cache for caching data. In addition to an L1 instruction cache and data cache, the processor memory system 108 includes a TLB, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104.

The highest level cache within the external memory system 113 (which may be the L2 cache if there are only two levels in the hierarchy) is the LLC 120, which is accessed just before main memory. Of course, this is only an example. The exact division between which level caches are within the processor memory system 108 and which are in the external memory system 113 can be different in other examples. For example, the L1 cache and the L2 cache could both be internal to the processor core 102, and the L3 (and higher) caches could be external to the processor core 102. Each processor core 102 could have its own internal L1 cache, and the processor cores could share an L2 cache. For the purposes of some of the examples described herein, the system 100 will be assumed to have an L1 cache within each processor core 102 and the L2 cache and higher levels within the external memory system 113. The external memory system 113 also includes a main memory controller 122, which is connected to any number of memory modules 124 serving as main memory (e.g., Dynamic Random Access Memory modules). In a particular cache level of the hierarchy, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (read or write) the memory block from a higher level cache, or from the main memory (in the case of a miss in the LLC).

The pipeline 104 includes multiple stages through which instructions advance, a cycle at a time. An instruction is fetched (e.g., in an instruction fetch (IF) stage or stages). An instruction is decoded (e.g., in an instruction decode (ID) stage or stages) to determine an operation and one or more operands. Alternatively, in some pipelines, the instruction fetch and instruction decode stages could overlap. An instruction has its operands fetched (e.g., in an operand fetch (OF) stage or stages). An instruction issues, which typically starts progression of the instruction through one or more stages of execution. Execution may involve applying the instruction's operation to its operand(s) for an arithmetic logic unit (ALU) instruction, storing or loading to or from a memory address for a memory instruction, or may involve evaluating a condition of a conditional branch instruction to determine whether or not the branch will be taken. Finally, an instruction is committed, which may involve storing a result (e.g., in a write back (WB) stage or stages). Instructions are fetched based on a program counter (PC), which is a pointer that is used to identify instructions within memory (e.g., within a portion of main memory, or within an instruction cache of the processor). The PC may advance through addresses of a block of compiled instructions (called a "basic block"), incrementing by a particular number of bytes (depending on how long each instruction is and on how many instructions are fetched at a time).

Figure 2:
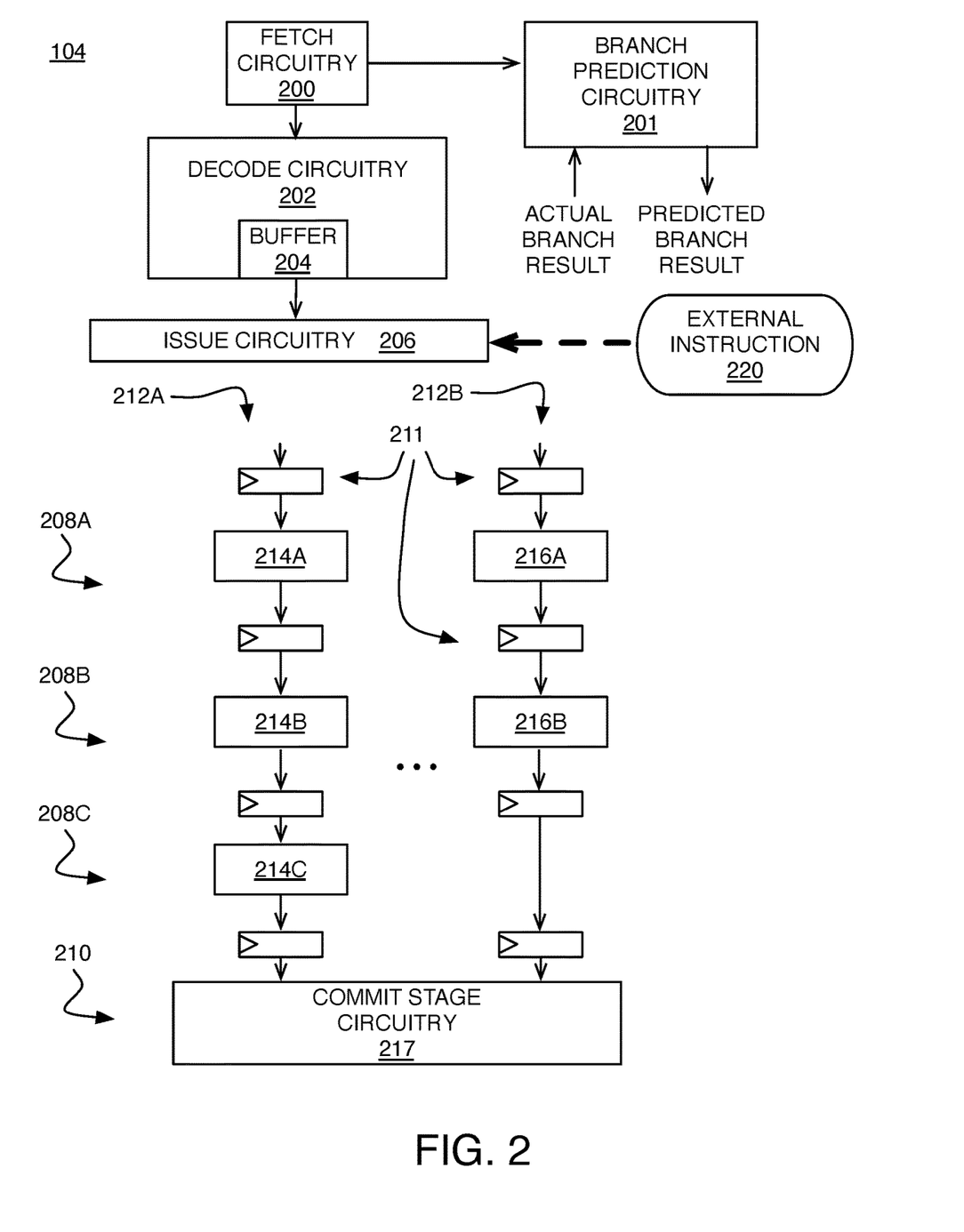
FIG. 2 is a schematic diagram of a processor core pipeline.

FIG. 2 shows an example in which the pipeline 104 is configured to receive external instructions, such as a Global-Sync instruction, which are inserted into the pipeline in a manner that avoids errors associated with out-of-order execution, as will be described in more detail below. The pipeline 104 includes circuitry for the various stages. For one or more instruction fetch stages, instruction fetch circuitry 200 provides a PC to an instruction cache in the processor memory system 108 to fetch instructions to be fed into the pipeline 104. For example, the PC can be a virtual address of the next instruction, in which case the PC can be incremented by the length of a virtual address in the case of sequential execution (i.e., without taking any branches). The fetch circuitry 200 also provides the program counter to branch prediction circuitry 201, which is used to provide a predicted branch result for branch instructions. The branch prediction circuitry 201 also stores branch history information that is updated based on a received actual branch result. In some implementations, some or all of the branch prediction circuitry 201 is considered part of the fetch circuitry 200. Decode circuitry 202 for one or more instruction decode stages includes a buffer 204 that stores information for instructions that are waiting to be issued.

Issue circuitry 206 determines in which cycle each of the instructions in the buffer 204 are to be issued, which makes them available to progress through circuitry of the execution stages 208A, 208B, and 208C of the pipeline 104. For simplicity, this example has three execution stages, but other examples may have more (or fewer) execution stages. There is also at least one commit stage 210 that commits results of instructions that have made their way through the execution stages 208A, 208B, and 208C. For example, commit stage circuitry 217 may write back a result into a register file 106 (FIG. 1).

The buffer 204 stores an instruction queue that represents all of the instructions in an "instruction window," which includes both: (1) instructions that have been decoded but not yet issued (e.g., instructions in the buffer 204), and (2) instructions that have been issued but are still "in progress" and have not yet been committed. As instructions are decoded, more instructions enter the instruction window by being stored in the buffer 204. Instructions leave the instruction window as they are committed, but not necessarily in one-to-one correspondence with instructions that enter the instruction window. Therefore, the size of the instruction window may vary. Instructions enter the instruction window in order (i.e., according to a program order), and leave the instruction window in order. But, in some implementations, instructions may be issued and/or executed out of order. While instructions are within the instruction window, there may be information stored in the instruction queue within the buffer 204 to track which of those instructions have been issued (i.e., are in progress), and which instructions have not yet been issued, as described in more detail below with reference to FIG. 3.

Between adjacent stages of the pipeline 104, the various paths through the pipeline circuitry include pipeline registers 211 (shown in FIG. 2 for the execution stages), which store results of an upstream stage waiting to be passed downstream to the next stage. The pipeline registers 211 may be clocked by (i.e., receive a clock signal derived from) a common clock (not shown). Thus, each clock cycle, each pipeline register 211 (also called a latch, or a set of flip-flops) passes a result from its input to its output and becomes ready to receive a new result in its input after that result has been produced by the circuitry of that stage.

There may be multiple separate paths through the execution stages that include various circuitry for executing different types of instructions. In FIG. 2, two paths 212A and 212B are shown, but the execution stages may include any number of paths with corresponding circuitry separated by pipeline registers 211. The number of paths through the execution stages is generally dependent on the specific architecture, but may correspond to the number of issue slots (called the "issue width") into which the issue circuitry 206 can issue instructions, such that multiple instructions can progress through the same execution stages in the same cycles. For example, there may be 5 issue slots into respective paths through the pipeline 104.

The number of stages that include functional circuitry for a given path may also differ. In this example, the first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A, the second execution stage 208B, respectively, with the third execution stage 208C being simply a "silo stage" that passes a result along without performing further computation, ensuring that each path passes through the same number of stages through the pipeline. One path may include circuitry for executing memory instructions, another path may include units for various operations (e.g., ALU, multiplier, floating point unit), and another path may include circuitry for performing memory access instructions, including load instructions that read data values from the memory system, and store instructions to write data values to the memory system. This circuitry also performs translation of virtual addresses to physical addresses when necessary, and management of the TLB within the processor memory system 108.

Referring again to FIG. 2, an external instruction 220, such as a GlobalSync instruction, is received and handled by the issue circuitry 206. When out-of-order execution is permitted, a potential error in operation could occur unless the issue circuitry 206 is configured to properly handle a GlobalSync instruction, or other instruction that has effects that are sensitive to program order. To illustrate the potential error in operation that would otherwise occur, an example is shown below. In this example, there are two internal instructions Load X, an instruction that loads data from address X, and Load Y, an instruction that loads data from an address Y. These instructions are issued in program order in the pipeline of a processor core (Core 0), and are followed by the same processor core (Core 0) receiving external instructions including TLBI X, an instruction that invalidates the address X, and a GlobalSync instruction:

cycle 1: Load X issued
cycle 2: Load Y issued
cycle 4: TLBI X received
cycle 7: GlobalSync received where Load X is issued in cycle 1, Load Y is issued in cycle 2, TLBI X is received in cycle 4 after being issued at Core 1, and GlobalSync is received in cycle 7 after a corresponding DSB was issued at Core 1. In this example, for each clock cycle, there may be other instructions also being issued at an issue stage, and other instructions being executed at later stages, or external instructions being received, but only these instructions relevant to the potential error are shown here, for simplicity. Also, these instructions may propagate through one or more stages before being "executed" in a memory access stage, for example, and may propagate through one or more stages after being "executed" (e.g., being reordered before reaching the final commit stage).

If the GlobalSync instruction (or an equivalent instruction) is inserted into the pipeline (at an issue stage or a later stage) too soon after the GlobalSync instruction is received, it may cause a potential error due to certain instructions being executed out of order. Since out-of-order execution is allowed, it is possible for instructions to finish executing (e.g., by a final memory access stage, or other appropriate stage, within the pipeline) in an order different from the program order, before any results of those instructions are reordered to be committed in program order. For example, it is possible for the instructions above to finish executing as follows:

cycle 9: Load Y executed
cycle 10: TLBI X executed
cycle 11: GlobalSync executed
cycle 12: Load X executed This execution order may result, for example, if the execution of the Load X instruction was stalled for some reason. In this example, for the Load X instruction, a translation for address X may have been obtained from the TLB before the TLBI X instruction was even received, for example, in cycle 3. But, because the actual Load X instruction has been delayed, use of that translation occurs after the GlobalSync instruction has executed, which violates a requirement of the GlobalSync instruction that the all TLB invalidations have been reflected in the architectural state of the processor after execution of the GlobalSync instruction has executed (which may involve acknowledgement of its execution back to Core 1). So, even though the address X was successfully translated, that translated value was invalidated by the TLBI X instruction in cycle 10, and remains invalid in cycle 12 (at which time there may be a new translation that has been mapped to the address X). In other words, the error is caused because the Load X instruction has obtained a translation prior to the GlobalSync instruction, before that translation has been invalidated, and then executes after the GlobalSync instruction after that translation has been invalidated.

To avoid this potential error, the GlobalSync can be inserted into the remote pipeline at a time when the executing instructions are being executed in program order. But, it may be difficult to ensure that this condition is true when out-of-order execution is permitted. One option for ensuring this condition would be to stall issuance of any decoded instructions, wait for all in-progress instructions to complete (including waiting for the write buffer to flush completely), and then insert the GlobalSync instruction into the pipeline (also called "clean insertion"). At the time the GlobalSync instruction is executed there would remain only instructions that had not yet issued in the instruction window. But, the clean insertion option could cause a long delay while all executing instructions make their way out of the pipeline. For example, there may be 15 pipeline stages after the issue stage and 5 issue slots, which allows a maximum of 45 instructions to be in progress within the pipeline. If none of the instructions are stalled, it may take 15 cycles to clear all 45 instructions. But, if any of the instructions in the 5 different paths stall, it could take longer to clear the pipeline. If, in a worst case scenario, instructions are assumed to be committed one instruction at a time, the delay to clear the pipeline of in-progress instructions could be 45 cycles. There would also be additional delay as the stages after the issue stage fill up again. This partial clearing and re-filling of instructions in the pipeline may be referred to as causing a "hole" in the pipeline.

Figure 3:
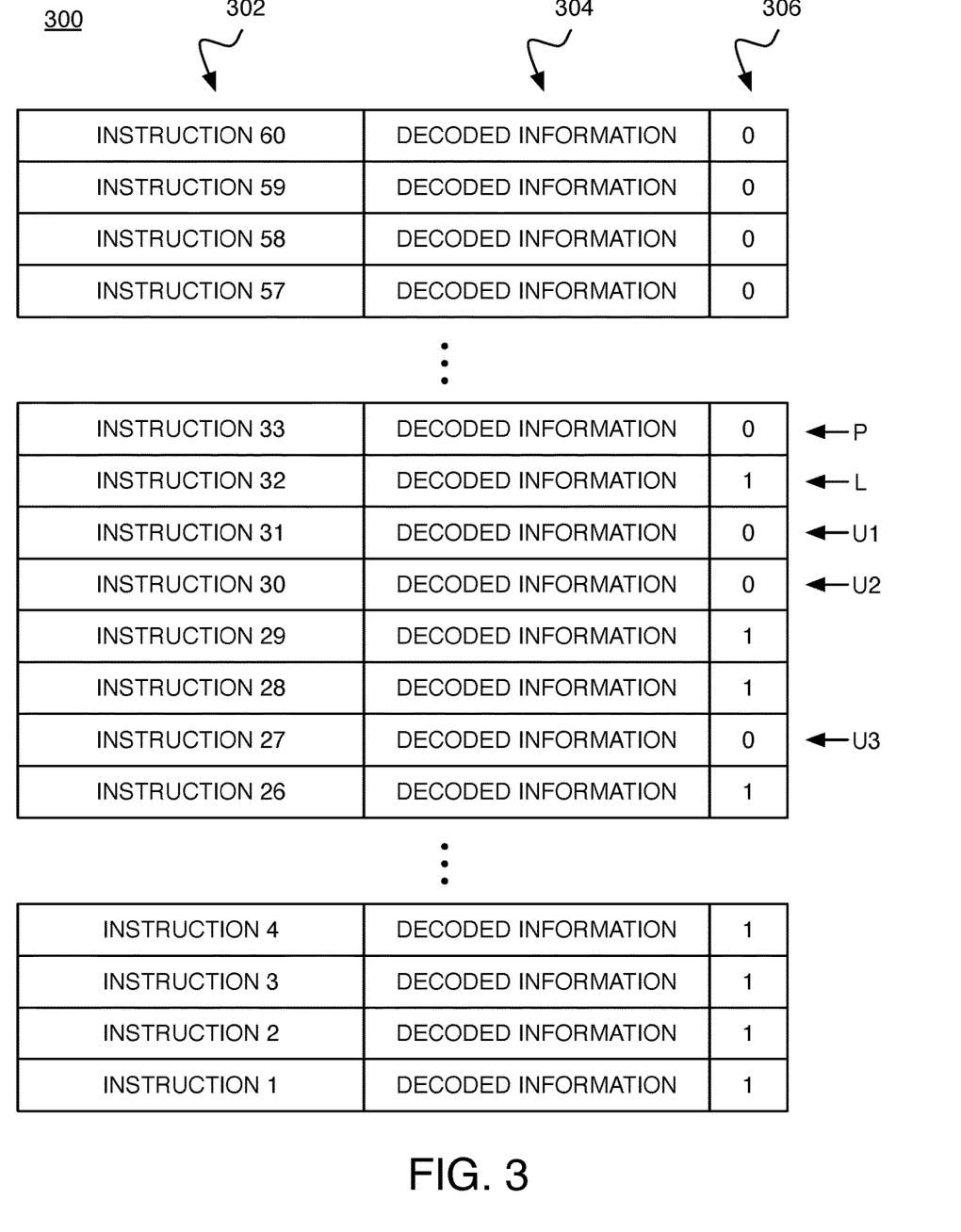
FIG. 3 is a schematic diagram of an instruction queue.

To limit the potential size of a hole that may be created in the pipeline, and the resulting performance impact, an alternative technique for avoiding the potential error reduces the duration of the delay for issuing new instructions after the GlobalSync instruction is received based on analysis of the instruction queue, as described in more detail below. FIG. 3 shows an example of an instruction queue 300 that may be stored in the buffer 204. In this example, there are 60 instructions that represent instructions in the instruction window. Instructions are added to the tail (at the top in FIG. 3) after they have been decoded, and removed from the head (at the bottom in FIG. 3) after they have been committed. The instruction queue 300 stores the decoded instruction (in section 302 of a queue entry), any decoded information associated with that instruction (in section 304 of a queue entry), and at least one bit (in section 306 of a queue entry) for tracking the "issue status" of the instruction indicating whether the instruction has been issued (a "1" in this example) or has not yet been issued (a "0" in this example).

The instructions themselves, comprising an opcode and any operands, are typically decoded and added to the instruction queue 300 in program order. So, in this example, the instructions 302 are labeled numerically based on program order (i.e., INSTRUCTION N is followed by INSTRUCTION N+1). The instruction labeled INSTRUC- TION 1 (not necessarily the first instruction of the program) is the next instruction to be committed and removed from the instruction queue, and the instruction labeled INSTRUCTION 60 is the most recent instruction to be decoded and added to the instruction queue. Alternatively, in other examples, the instructions are not necessarily decoded or stored in program order, but equivalently there may be information stored in a queue entry indicating the program order of the instruction stored in that entry.

After a GlobalSync instruction (or other external instruction 220 sensitive to program order) is received, the issue circuitry 206 (or other instruction management circuitry) processes the issue status information in section 306 to determine how to place the pipeline 104 in the appropriate state for error-free insertion of the GlobalSync instruction. In this example, the processing of the issue status information includes identifying certain instructions based on whether the issue bit in section 306 is set ("1") or not set ("0"). In some implementations, this is done by scanning the instruction queue 300 from the tail to the head to identify those instructions. Before the scanning, the issue circuitry 220 pauses issuance of any new instructions. So, the issue bits will not be changing during the scanning. The first instruction to be identified in the scanning is the first instruction that has its issue bit set representing the last instruction in program order to issue (shown with the label "L"), which in this example is INSTRUCTION 32. The next instructions to be identified are any instructions earlier in program order than the instruction L that are unissued (shown with the labels "U1," "U2," . . . ). These out-of-order unissued (OOU) instructions, if any exist, are identified as any instructions encountered whose issue bit is not set after the scanning has identified the instruction L. In this example, there are 3 OOU instructions to be identified: INSTRUCTION 31 (U1), INSTRUCTION 30 (U2), and INSTRUCTION 27 (U3).

After the OOU instructions are identified, the issue circuitry 220 selectively resumes issuance in order to issue just the identified OOU instructions. After the OOU instructions issue, the pipeline 104 is in the appropriate state to be ready for insertion of the GlobalSync instruction. In particular, the GlobalSync instruction (or other instruction for performing the GlobalSync operation) is inserted into a particular stage of the pipeline 104 such that the GlobalSync operation is committed after the instruction L is committed and before any of the paused instructions are committed. For example, before the issuing of new instructions resumes, the GlobalSync instruction can be inserted between the instruction L and the next unissued instruction in the program order among the instructions whose issuance was paused (shown with the label "P"), which in this example is INSTRUCTION 33. By the time the GlobalSync instruction executes (e.g., at a memory access stage), after instruction L and before instruction P, there will not have been any memory access instructions earlier in program order than instruction L (according to program order) that execute after the GlobalSync instruction, since instructions on the same path cannot pass each other in the pipeline.

One of the advantages of this alternative technique for avoiding the potential error described above is that the pipeline 104 does not need to pause instruction issuance for as long, thus limiting the size of any hole created in the pipeline 104. In the example above, the pause is only long enough for the OOU instructions to be identified and issued, which is potentially much shorter than the pause that would be needed for a full flush of all issued instructions in the pipeline.

Other embodiments are within the scope of the following claims.

What is claimed is:

1. An integrated circuit comprising:
   at least a first processor core executing instructions in a pipeline configured for out-of-order issuing of instructions; and
   instruction management circuitry configured for managing external instructions received from outside the first processor core, the managing including:
     updating issue status information for a plurality of instructions stored in an instruction queue,
     maintaining an indication of a program order for the plurality of instructions as they are stored in the instruction queue,
     processing at least a portion of the issue status information in response to receiving a first external instruction to identify at least two instructions in the instruction queue, the identified instructions including a first queued instruction and a second queued instruction, wherein the first queued instruction is an unissued instruction that is adjacent to an issued instruction in the program order, with no later instructions in the program order having been issued, and the second queued instruction is an unissued instruction that is adjacent to an issued instruction in the program order, with all earlier instructions in the program order having been issued, and
     inserting an instruction for performing an operation associated with the first external instruction into a stage of the pipeline so that the operation associated with the first external instruction is committed before the first queued instruction is committed and after the second queued instruction is committed.

2. The integrated circuit of claim 1, further comprising:
   translation circuitry configured for handling translation of virtual addresses to physical addresses, the handling including:
     storing translations between virtual addresses and physical addresses in a translation lookaside buffer, and
     updating at least one translation lookaside buffer entry in the translation lookaside buffer based at least in part on an external instruction received from outside the first processor core.

3. The integrated circuit of claim 2, wherein updating at least one translation lookaside buffer entry in the translation lookaside buffer based at least in part on an external instruction received from outside the first processor core comprises invalidating at least one translation lookaside buffer entry in the translation lookaside buffer before an associated synchronization operation is committed by a commit stage.

4. The integrated circuit of claim 3, wherein maintaining an indication of the program order for the plurality of instructions as they are stored in the instruction queue comprises associating different instructions in the instruction queue with different respective labels based on the program order.

5. The integrated circuit of claim 3, wherein the operation associated with the first external instruction comprises the associated synchronization operation.

6. The integrated circuit of claim 3, wherein the associated synchronization operation comprises a Global Synchronization instruction.

7. The integrated circuit of claim 6, wherein the Global Synchronization instruction is broadcast as a side-effect of a data synchronization barrier (DSB) instruction.

8. The integrated circuit of claim 7, wherein the DSB instruction was issued at a second processor core in the integrated circuit that includes the first processor core.

9. The integrated circuit of claim 1, wherein the plurality of instructions include at least two instructions that are issued out of order relative to each other, according to the program order for the plurality of instructions, in at least one issue stage of the pipeline, and the plurality of instructions are committed in order, according to the program order, in at least one commit stage of the pipeline.

10. The integrated circuit of claim 1, wherein at least one second processor core in the integrated circuit provides the first external instruction.

11. A method comprising:
executing instructions in a pipeline of a first processor core, the pipeline being configured for out-of-order issuing of instructions; and
managing external instructions received from outside the first processor core, the managing including:
updating issue status information for a plurality of instructions stored in an instruction queue,
maintaining an indication of a program order for the plurality of instructions as they are stored in the instruction queue,
processing at least a portion of the issue status information in response to receiving a first external instruction to identify at least two instructions in the instruction queue, the identified instructions including a first queued instruction and a second queued instruction, wherein the first queued instruction is an unissued instruction that is adjacent to an issued instruction in the program order, with no later instructions in the program order having been issued, and the second queued instruction is an unissued instruction that is adjacent to an issued instruction in the program order, with all earlier instructions in the program order having been issued, and
inserting an instruction for performing an operation associated with the first external instruction into a stage of the pipeline so that the operation associated with the first external instruction is committed before the first queued instruction is committed and after the second queued instruction is committed.

12. The method of claim 11, further comprising:
handling translation of virtual addresses to physical addresses, the handling including:
storing translations between virtual addresses and physical addresses in a translation lookaside buffer, and
updating at least one translation lookaside buffer entry in the translation lookaside buffer based at least in part on an external instruction received from outside the first processor core.

13. The method of claim 12, wherein updating at least one translation lookaside buffer entry in the translation lookaside buffer based at least in part on an external instruction received from outside the first processor core comprises invalidating at least one translation lookaside buffer entry in the translation lookaside buffer before an associated synchronization operation is committed by a commit stage.

14. The method of claim 13, wherein maintaining an indication of the program order for the plurality of instructions as they are stored in the instruction queue comprises associating different instructions in the instruction queue with different respective labels based on the program order.

15. The method of claim 13, wherein the operation associated with the first external instruction comprises the associated synchronization operation.

16. The method of claim 13, wherein the associated synchronization operation comprises a Global Synchronization instruction.

17. The method of claim 16, wherein the Global Synchronization instruction is broadcast as a side-effect of a data synchronization barrier (DSB) instruction.

18. The method of claim 17, wherein the DSB instruction was issued at a second processor core in an integrated circuit that includes the first processor core.

19. The method of claim 11, wherein the plurality of instructions include at least two instructions that are issued out of order relative to each other, according to the program order for the plurality of instructions, in at least one issue stage of the pipeline, and the plurality of instructions are committed in order, according to the program order, in at least one commit stage of the pipeline.

20. The method of claim 11, wherein at least one second processor core in an integrated circuit that includes the first processor core provides the first external instruction.

* * * * *